United States Patent
Ortacdag et al.

(10) Patent No.: US 8,537,831 B2
(45) Date of Patent: Sep. 17, 2013

(54) METHOD AND SYSTEM FOR COMMON GROUP ACTION FILTERING IN TELECOM NETWORK ENVIRONMENTS

(75) Inventors: Erel Ortacdag, Ottawa (CA); Nirmesh Patel, Kanata (CA)

(73) Assignee: Alcatel Lucent, Paris (FR)

( * ) Notice: Subject to any disclaimer, the term of this patent is extended or adjusted under 35 U.S.C. 154(b) by 346 days.

(21) Appl. No.: 12/658,910

(22) Filed: Feb. 17, 2010

(65) Prior Publication Data

US 2011/0200050 A1  Aug. 18, 2011

(51) Int. Cl.
*H04L 12/28* (2006.01)
*H04L 12/56* (2011.01)

(52) U.S. Cl.
USPC .................... 370/395.32; 370/395.31

(58) Field of Classification Search
USPC .................. 370/395.31, 389, 390
See application file for complete search history.

(56) References Cited

U.S. PATENT DOCUMENTS 7,516,119 B1 * 4/2009 Kao .................................. 1/1
7,796,593 B1 * 9/2010 Ghosh et al. ............... 370/389
2003/0152075 A1  8/2003 Hawthorne, III et al.
2009/0135833 A1  5/2009 Lee et al.
2012/0026881 A1 * 2/2012 Zuk et al. ..................... 370/235

FOREIGN PATENT DOCUMENTS

WO  9713377  4/1997

OTHER PUBLICATIONS

International Search Report, International Application No. PCT/IB2011/000714, Report dated Jun. 6, 2011, 11 pages.

* cited by examiner

*Primary Examiner* — Chuong T Ho
(74) *Attorney, Agent, or Firm* — Hitt Gaines, PC

(57) ABSTRACT

A routing apparatus comprises memory including a common group identifier correlated to a plurality of values each derived using a specified network parameter, memory including a common group action correlated to the common group identifier, a parse action module configured for accessing the common group identifier correlating memory and for associating the common group identifier with a packet configured with the specified network parameter, and a common group action module configured for accessing the common group action correlating memory and for determining the common group action be applied to the packet. Determining the common group action to be applied to the packet includes selecting the common group action dependent upon the common group identifier.

18 Claims, 2 Drawing Sheets

FIG. 2

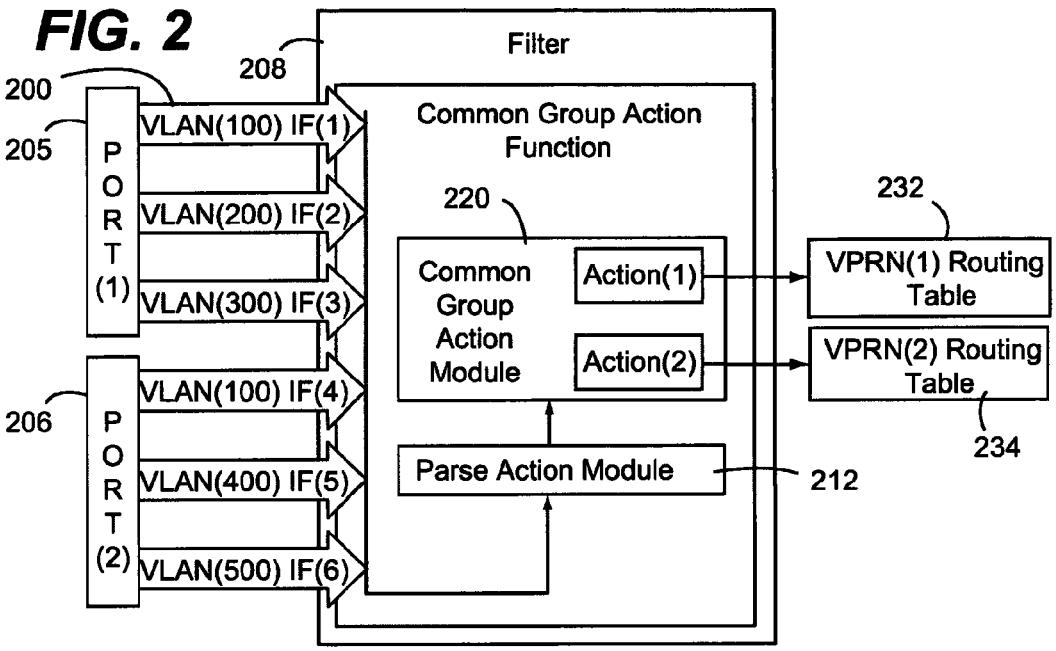

FIG. 3

| Parse Action Look-Up Memory | | 210 |
|---|---|---|
| Hash Result (Port(1), VLAN(100)) | Common Group ID(1) | 218 |
| Hash Result (Port(1), VLAN(200)) | Common Group ID(1) | |
| Hash Result (Port(1), VLAN(300)) | Common Group ID(2) | |
| Hash Result (Port(2), VLAN(100)) | Common Group ID(2) | |
| Hash Result (Port(2), VLAN(400)) | Common Group ID(1) | |
| Hash Result (Port(2), VLAN(500)) | Common Group ID(2) | |

| Common Group Action Look-Up Memory | | 225 |
|---|---|---|
| Hash Result(Common Group ID(1)) | Common Group Action (1) | 229 |
| Hash Result(Common Group ID(2)) | Common Group Action (2) | |

227

METHOD AND SYSTEM FOR COMMON GROUP ACTION FILTERING IN TELECOM NETWORK ENVIRONMENTS

FIELD OF THE DISCLOSURE

The disclosures made herein relate generally to telecom network systems and method of communication information therewith and, more particularly, to using filters to apply rules to traffic traversing a telecom network.

BACKGROUND

In network processor based routers and switches, filters can be used to take actions on incoming and outgoing packets. Network processor based routers are defined herein to include field programmable gate array (FPGA) based routers and switches (i.e., routing apparatuses). Examples of such actions include, but are not limited to, routing table mapping, access control list mapping, and the like. These filters use pre-defined fields that are parsed from the incoming packets and/or incoming interfaces and/or entities. Rules are programmed on filters with different values to match on criteria to take some actions. Accordingly, as is shown in FIG. 1, when the number of interfaces (referred to in FIG. 1 as "IF") belonging to a common group (e.g. VPRN(1) or VPRN(2)) is large and a filter needs to take a common action (e.g., assigning to a respective VPRN routing table) on all these interfaces, a particular rule must be configured on the filter on a per-interface basis.

To date, this approach of configuring individual rules for each interface/entity to get the same group behavior is the best-known solution for configuring filters in network processor based routers and switches to take actions on incoming and outgoing packets. The need for this rule to be configured for each interface (i.e., unique rule per interface) results in undesirable consumption of memory per rule, which can cause performance degradation due to memory resources utilized by rule searching mechanisms. For example, in one embodiment of such filtering functionality, hardware-based CAM (Content Addressable Memory) is used for fast searching mechanism. Undesirably, consuming large numbers of rules in the hardware-based CAM is expensive in terms of memory usage.

SUMMARY OF THE DISCLOSURE

Embodiments of the present invention provide a memory-efficient means of using filters to take actions on incoming and outgoing packets within a telecom network environment. As shown in FIG. 1, prior art solutions for implementing such filtering functionality typically rely upon memory that is relatively fast (e.g., static random access memory (SRAM)) to reduce read/write time to achieve faster packet processing, which can result in additional cost. In contrast to such prior art solutions, implementing such filtering functionality in accordance with an embodiment of the present invention entails using network processors and/or FPGAs, which reduces the memory required to store flow context and, therefore, advantageously reduces memory cost. Additionally, another benefit of implementing such filtering functionality in accordance with an embodiment of the present invention is to prevent performance degradation by significantly reducing the number of searches performed by the network processors. In this manner, embodiment of the present invention can enhance memory usage, reduce cost, decrease memory access bandwidth, and improve packet processing performance.

In one embodiment of the present invention, a method for providing common group action on packets being processed by a packet routing apparatus comprises a plurality of operations. At least one data processing device performs accesses, from memory coupled to the at least one data processing device, instructions causing the at least one data processing device to associate a common group identifier with a packet. The common group identifier uniquely indicates a group of packets having at least one common network parameter. Causing the at least one data processing device to associate the common group identifier with the packet includes causing the at least one data processing device to select the common group identifier dependent upon the at least one common network parameter and from a plurality of available common group identifier each retained in a respective memory location. The at least one data processing device accesses, from the memory, instructions causing the at least one data processing device to determine a common group action to be applied to the packet. Causing the at least one data processing device to determine the common group action to be applied to the packet includes causing the at least one data processing device to select the common group action dependent upon the associated common group identifier and from a plurality of available common group actions each retained in a respective memory location.

In another embodiment of the present invention, a computer-readable medium has tangibly embodied thereon and accessible therefrom a set of instructions interpretable by at least one data processing device. The set of instructions is configured for causing the at least one data processing device to carry out operations for associating a common group identifier with a packet and determining a common group action to be applied to the packet. The common group identifier uniquely indicates a group of packets having at least one common network parameter. Associating the common group identifier with the packet includes selecting the common group identifier dependent upon the at least one common network parameter and from a plurality of available common group identifier each retained in a respective memory location. Determining the common group action to be applied to the packet includes selecting the common group action dependent upon the associated common group identifier and from a plurality of available common group actions each retained in a respective memory location.

In another embodiment of the present invention, a routing apparatus comprises memory including a common group identifier correlated to a plurality of values each derived using a specified network parameter, memory including a common group action correlated to the common group identifier, a parse action module configured for accessing the common group identifier correlating memory and for associating the common group identifier with a packet configured with the specified network parameter, and a common group action module configured for accessing the common group action correlating memory and for determining the common group action be applied to the packet. Determining the common group action to be applied to the packet includes selecting the common group action dependent upon the common group identifier.

These and other objects, embodiments, advantages and/or distinctions of the present invention will become readily apparent upon further review of the following specification, associated drawings and appended claims.

BRIEF DESCRIPTION OF THE DRAWINGS

FIG. 2 is a diagrammatic view showing an implementation of common group action functionality configured in accordance with an embodiment of the present invention.

FIG. 3 is table showing an embodiment of parse action look-up memory locations configured in accordance with an embodiment of the present invention.

FIG. 4 is table showing an embodiment of common group action look-up memory locations configured in accordance with an embodiment of the present invention.

DETAILED DESCRIPTION OF THE DRAWING FIGURES

Figure 1:
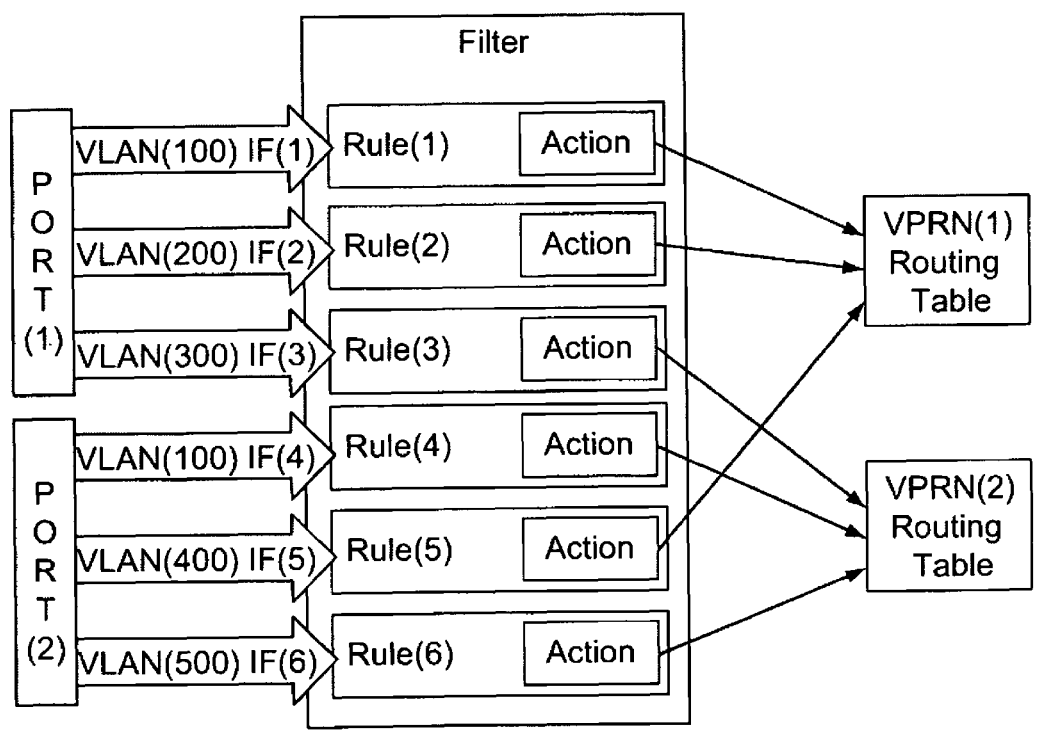
FIG. 1 is a diagrammatic view showing a prior art implementation of ruled-based filtering on a per-interface basis.

In contrast to prior art approaches of using filters to take actions on incoming and outgoing packets within a telecom network environment, embodiments of the present invention utilize a group identifier for determining which rule to apply to each instance of a particular group entity. Examples of such group entities include, but are not limited to a group having a common network interface parameter (e.g., a network interface number), a group having a common group handler (e.g., VPRN, VPLS, etc), a group having a common port identifier. Each incoming packet of a router or switch enabled in accordance with an embodiment of the present invention has an identifier associated with it. Each identifier is a group identifier that is shared among instances of a common group entity, thereby allowing it to subsequently be used as a common group identifier. The common group identifier can be retained, for example, in an internal register, internal random access memory (RAM), and/or via packet encapsulation. In conjunction with the common group identifier being assigned to a packet, it serves a look-up parameter (e.g., field) in a filter to take a common action that is shared between multiple group entity instances (i.e., those defined by a particular common group identifier). This approach of associating an identifier and using the identifier to look-up (i.e., match) a corresponding rule is referred to herein as common group action functionality. Accordingly, embodiments of the present invention significantly reduce the number of rules configured against the filter.

Referring to FIG. 2, a specific implementation of providing common group action functionality in accordance with an embodiment of the present invention is presented. While the depicted implementation is an internal register based implementation, in view of the disclosures made herein, a skilled person will be able to modify such implementation for being an internal RAM based implementation, packet encapsulation implementation, or other suitable type of implementation. An interface is a logical entity that can either be represented by a physical port or physical port and VLAN identifier (IEEE 802.1Q) combined. Each interface for a particular group entity (e.g. VPRNs—Virtual Private Networks, rfc2547) instance (arrowed blocks 200) represents a group entity instance. Each one of the VPRN interface instances is coupled between a respective port (blocks 205 and 206) and a filter 208. The filter 208 is configured for performing group action functionality.

Referring to FIGS. 2 and 3, memory locations within parse action look-up memory 210 are each pre-configured with a parsing action for associating a common group identifier (ID) with a corresponding port and VLAN ID combination. It is disclosed herein that the such memory location can also be configured with parse action information relating to actions associated with accepting traffic, actions associated with selecting TM (Traffic Management) queues, and the like. When a frame is received on one of the ports 205, 206, a packet thereof is provided to a parse action module 212 of the filter 208 where it is subjected to a parse action hash performed on the port and VLAN ID of the packet. Circular Redundancy Check-32 (CRC-32) hash is an example of such a parse action hash. The hash result (e.g., hash value) from the parse action hash (e.g., at memory location 215 of the parse action look-up memory 210) is used for determining a memory location of a corresponding common group ID (e.g., at memory location 218 of the parse action look-up memory 210), followed by content of that memory location being fetched to an internal register of the apparatus implementing the filter (e.g., network processor (NP) of a routing apparatus or switch apparatus). A network processor is an example of a data processing unit. Thereafter, the packet is then sent to a common action module 220 of the filter 208.

It is disclosed herein that interfaces mentioned herein can be either one per port in case of a null encapsulated (no VLAN headers) port in case of an Ethernet technology (i.e., IEEE 802.1Q) or more than one interface per port (with VLAN headers). Because VLAN ID is a 12-bit field, it can be 4K interfaces per port max. It is also disclosed herein that the parse action hash is preferably derived per port and VLAN ID. Each interface can belong to one of the VPRN instances and each VPRN instance has its own routing table.

Referring now to FIGS. 2 and 4, memory locations within common group action look-up memory 225 and corresponding hash rules are configured with common group actions per common group ID's possible via the parse action hash. When the packet is received by the common action module 220, the common group ID of the packet is subjected to a common action hash. The hash result from the common action hash (e.g., at memory location 227 of the common group action look-up memory 225) is used for determining a memory location of a corresponding common group action (e.g., at memory location 229 of the common group action look-up memory 225). The corresponding common group action is fetched from the memory location and the packet is processed using this fetched common group action.

Each one of the common group actions provides for a packet having a particular common group ID to be sent to a common group action handler unit such as respective VPRN routing table. Accordingly, in the case where the packet corresponds to VPRN interface (1), regardless of which port or port/VLAN ID it was received on, it is forwarded to the VPRN(1) routing table 232. Alternatively, in the case where the packet corresponds to VPRN interface (2), regardless of which port or port/VLAN ID it was received on, it is forwarded to the VPRN(2) routing table 234.

It is disclosed herein that VPRN is an example of a common group handler where many (e.g., thousands of) interfaces need to do the same action (i.e., common group action). Accordingly, instead of VPRNs, a common group handler in accordance with the present invention can be another type of common group handler such as, for example, VPLS (Virtual Private LAN (Local Area Network) Services).

It is disclosed herein that the operations jointly performed by parse action module 212 and the common group action module represent a single rule for carrying out common group action functionality in accordance with an embodiment of the present invention. As such, a skilled person will appreciate that, in the implementations where a considerable number interfaces belonging to a single VPRN instance (e.g., VPRN(1) or (VPRN(2)), only one rule and corresponding action per VPRN instance needs to be configured in a filter configured in accordance with an embodiment of the present invention. In contrast, the prior art filter approach depicted in FIG. 1 would require a rule and corresponding action to be configured for each interface instance.

The VPRN interface filtering discussed above in reference to FIGS. 2-4 is one example of implementing common group action functionality in accordance with an embodiment of the present invention. It is disclosed herein that common group action functionality in accordance with the present invention can be expanded for other uses where common actions are required. For example, if more fields in the filter of FIG. 2 are required per VPRN instance for taking some other common action(s), an even larger number of rule savings can result from implementation of common group action functionality in accordance with the present invention.

Compared to prior art implementations of common group action functionality for a plurality of interfaces, common group action functionality in accordance with an embodiment of the present invention considerably reduces the number of rules configured against a filter. In such a prior art implementation of common group action functionality, memory locations are pre-configured with prior art parsing actions such as, for example, parse action associated with accepting traffic, actions associated with selecting TM queues, and the like for specific port and VLAN ID combinations. Different memory locations and hash rules are configured with common group actions per port and VLAN ID combinations. When a frame is received on a port (e.g., Ethernet port) of an apparatus carrying out the rules-based filtering, a hash (e.g., crs-32 hash) is performed on the port and VLAN ID combinations and the result of the hash lookup points to a corresponding one of such pre-configured memory locations. Content of such corresponding memory location is fetched to an internal register of the apparatus carrying out the rules-based filtering. The packet is then sent to the next processing module where ingress port and VLAN ID from the packet is hashed and compared with information corresponding to the pre-configured common group actions. Thereafter, the common group action is fetched from a respective memory location and the packet is processed using the common group action fetched. As can be seen, in this prior art implementation of common group action functionality, the number of hash rules that needs to be configured for common group actions on a per port and VLAN ID combination basis is much larger that the number of hash rules that needs to be configured for common group actions ion accordance with the present invention. As such, implementing common group action functionality in accordance with embodiments of the present invention utilize memory space in a more efficient manner than prior art implementations of common group action functionality.

Referring now to instructions processible by a data processing device, it will be understood from the disclosures made herein that methods, processes and/or operations adapted for carrying out common group action functionality as disclosed herein are tangibly embodied by computer readable medium having instructions thereon that are configured for carrying out such functionality. In one specific embodiment, the instructions are tangibly embodied for carrying out the methodology disclosed above in reference to FIGS. 2-4. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. In this manner, the parse action module and common group actuation module disclosed herein can be embodied as instructions accessible from memory and carried out by a data processing device such as, for example a network processor and/or central processing unit of a packet routing apparatus. Accordingly, embodiments of computer readable medium in accordance with the present invention include a compact disk, a hard drive, RAM or other type of storage apparatus that has imaged thereon a computer program (i.e., instructions) adapted for carrying out common group action functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for providing common group action on packets being processed by a packet routing apparatus, comprising:

at least one data processing device accessing, from memory coupled to said at least one data processing device, instructions causing said at least one data processing device to associate a common group identifier with a packet, wherein the common group identifier uniquely indicates a group of packets having a common group action handler and wherein causing said at least one data processing device to associate the common group identifier with the packet includes causing said at least one data processing device to select the common group identifier dependent upon said common group action handler and from a plurality of available common group identifier each retained in a respective memory location, wherein said instructions causing said at least one data processing device to associate a common group identifier with a packet includes causing said at least one data processing device to derive a hash result using said common group action handler; and said at least one data processing device accessing, from said memory, instructions causing said at least one data processing device to determine a common group action to be applied to the packet, wherein causing said at least one data processing device to determine the common group action to be applied to the packet includes causing said at least one data processing device to select the common group action dependent upon said associated common group identifier and from a plurality of available common group actions each retained in a respective memory, wherein said common group action handler includes a common virtual network interface parameter and causing said at least one data processing device to generate said common group action handler derived hash result includes using the common virtual network interface parameter.

2. The method of claim 1 wherein causing said at least one data processing device to associate the common group identifier with the packet further includes causing said at least one data processing device to select the common group identifier dependent upon said common group action handler derived hash result.

3. The method of claim 1 wherein causing said at least one data processing device to determine the common group action includes causing said at least one data processing device to:
   derive a hash result using said associated common group identifier; and
   select the common group action dependent upon said common group identifier derived hash result.

4. The method of claim 1 wherein causing said at least one data processing device to determine the common group action includes causing said at least one data processing device to:
   derive a hash result using said associated common group identifier; and
   select the common group action dependent upon said common group identifier derived hash result.

5. The method of claim 1, wherein said packet includes said common group action handler when received at said packet routing apparatus.

6. The method of claim 5 wherein causing said at least one data processing device to determine the common group action includes causing said at least one data processing device to:
   derive a hash result using said associated common group identifier;
   access memory locations correlating the common group action to the common group identifier; and
   fetch contents memory location content corresponding to the common group action dependent upon the common group identifier derived hash result.

7. A non-transitory computer-readable medium having tangibly embodied thereon and accessible therefrom a set of instructions interpretable by at least one data processing device, said set of instructions configured for causing said at least one data processing device to carry out operations for:
   associating a common group identifier with a packet, wherein the common group identifier uniquely indicates a group of packets having a common group action handler and wherein associating the common group identifier with the packet includes selecting the common group identifier dependent upon said common group action handler and from a plurality of available common group identifier each retained in a respective memory location, wherein said instructions causing said at least one data processing device to associate a common group identifier with a packet includes causing said at least one data processing device to derive a hash result using said common group action handler; and
   determining a common group action to be applied to the packet, wherein determining the common group action to be applied to the packet includes selecting the common group action dependent upon said associated common group identifier and from a plurality of available common group actions each retained in a respective memory location, wherein said common group action handler includes a common virtual network interface parameter and causing said at least one data processing device to generate said common group action handler derived hash result includes using the common virtual network interface parameter.

8. The non-transitory computer-readable medium of claim 7 associating the common group identifier with the packet further includes:
   selecting the common group identifier dependent upon said common group action handler derived hash result.

9. The non-transitory computer-readable medium of claim 8 wherein determining the common group action includes:
   generating a hash result derived using said associated common group identifier; and
   selecting the common group action dependent upon said common group identifier derived hash result.

10. The non-transitory computer-readable medium of claim 7 wherein determining the common group action includes:
    deriving hash result derived using said associated common group identifier; and
    selecting the common group action dependent upon said common group identifier derived hash result.

11. The non-transitory computer-readable medium of claim 7, wherein said common group action handier is part of said packet before associating the common group identifier with the packet.

12. The non-transitory computer-readable medium of claim 11 wherein determining the common group action includes:
    generating a hash result derived using said associated common group identifier;
    accessing memory locations correlating the common group action to the common group identifier; and
    fetching contents memory location content corresponding to the common group action dependent upon the common group identifier derived hash result.

13. A routing apparatus, comprising:
    memory including a common group identifier correlated to a plurality of values each derived using a common group action hander;
    memory including a common group action correlated to the common group identifier;
    a parse action module configured for accessing said common group identifier correlating memory and for associating the common group identifier with a packet configured with the common group action handler, wherein associating the common group identifier with the packet includes causing the at least one data processing device to derive a hash result using the common group action handler; and
    a common group action module configured for accessing said common group action correlating memory and for determining the common group action be applied to the packet, wherein determining the common group action to be applied to the packet includes selecting the common group action dependent upon the common group identifier, wherein the common group action handler includes a common virtual network interface parameter and causing the at least derived hash result includes using the common virtual network interface parameter.

14. The routing apparatus of claim 13 wherein associating the common group identifier with the packet further includes:
    selecting the common group identifier dependent upon said common group action handler derived hash result.

15. The routing apparatus of claim 14 wherein determining the common group action includes:
    generating a hash result derived using said associated common group identifier; and
    selecting the common group action dependent upon said common group identifier derived hash result.

16. The routing apparatus of claim 13 wherein determining the common group action includes:
    deriving hash result derived using said associated common group identifier; and
    selecting the common group action dependent upon said common group identifier derived hash result.

17. The routing apparatus of claim 13, wherein the common group action handler is a portion of said packet before said packet is associated with the common group identifier.

18. The routing apparatus of claim 17 wherein determining the common group action includes:
- generating a hash result derived using said associated common group identifier; and
- fetching contents memory location content for the common group action dependent upon said common group identifier derived hash result.

* * * * *